US008688169B2

(12) United States Patent
Venugopal (10) Patent No.: US 8,688,169 B2
(45) Date of Patent: Apr. 1, 2014

(54) APPARATUS AND METHOD FOR DETECTING AND STORING DATA FROM SUBSCRIBER IDENTITY MODULE IN A PORTABLE TERMINAL (75) Inventor: Mythri Bandigadi Venugopal, Middlesex (GB)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/443,948

(22) Filed: Apr. 11, 2012

(65) Prior Publication Data

US 2012/0276955 A1 Nov. 1, 2012

(30) Foreign Application Priority Data

Apr. 28, 2011 (GB) .................... 1107180.0
Mar. 6, 2012 (KR) ........................ 10-2012-0022774

(51) Int. Cl.
*H04M 1/00* (2006.01)
*H04B 1/38* (2006.01)

(52) U.S. Cl.
USPC ....................................... 455/553.1; 455/558

(58) Field of Classification Search
USPC ..................... 455/550.1, 552.1, 553.1, 558
See application file for complete search history.

(56) References Cited

U.S. PATENT DOCUMENTS

| | | | |
|---|---|---|---|
| 2009/0061932 A1 | 3/2009 | Nagarajan | |
| 2009/0186651 A1 | 7/2009 | You | |
| 2010/0009716 A1 | 1/2010 | Lee et al. | |
| 2010/0035579 A1 | 2/2010 | Kim et al. | |
| 2010/0159988 A1 | 6/2010 | Lee | |
| 2010/0240414 A1* | 9/2010 | Lotenberg | 455/558 |
| 2011/0269503 A1* | 11/2011 | Park et al. | 455/552.1 |

FOREIGN PATENT DOCUMENTS

| | | |
|---|---|---|
| EP | 2019540 A2 | 1/2009 |
| EP | 2043395 A1 | 4/2009 |
| EP | 2 227 049 A1 | 9/2010 |
| WO | 2007/108811 A2 | 9/2007 |

* cited by examiner

*Primary Examiner* — Nguyen Vo
(74) *Attorney, Agent, or Firm* — Cha & Reiter, LLC (57) ABSTRACT A portable terminal comprising first and second identity modules, the first module serving as a master module, wherein a processor of the portable terminal is arranged: at power up of the portable terminal, to read data from the first module and to store it in a memory; and to access, in the memory, the data from the first module, before data from the second identity module is read into the memory.

8 Claims, 6 Drawing Sheets

FIG.6

APPARATUS AND METHOD FOR DETECTING AND STORING DATA FROM SUBSCRIBER IDENTITY MODULE IN A PORTABLE TERMINAL

CLAIM OF PRIORITY

This application claims priority under 35 U.S.C. §119(a) to a Application filed in the Korean Intellectual Property Office on Mar. 6, 2012 and assigned Serial No. 10-2012-0022774 and an Application filed in the Great Britain Intellectual Property Office on Apr. 28, 2011 and assigned Serial No. 1107180.0, the entire disclosure of which is incorporated herein by reference.

BACKGROUND

The present invention is related to a portable terminal, and more particularly, to an apparatus and method for detecting and storing data from a subscriber identity module (SIM) in a portable terminal.

DESCRIPTION OF RELATED ART

A portable terminal such as mobile telephone, personal digital assistant, laptop computer, tablet computer or data communication device is typically provided with a single identity in the form of a SIM or other similar component. Now days, a greater number of them are provided with the increased capacity to have a plurality of different identities.

Identity modules or any device capable of identifying a particular user, device or subscriber often take the form of a removable memory card, which is programmed to include data identifying a particular subscriber. One particular example is in the field of mobile telephony where a mobile telephone may be provide with two (or more) SIM card slots for receiving two (or more) SIM cards, each of which is associated with a separate identity (e.g. telephone number). As a result, a user can selectively elect one of the multiple SIM cards in association with a particular network provider to access certain features. For instance, a mobile telephone may be provided with the ability to operate on both second-generation (2G) and third-generation (3G) networks. The mobile telephone may have a first SIM card associated with the 2G network and a second SIM card associated with the 3G network. However, such an arrangement can pose problems to a user who wishes to use a particular SIM to make calls on the network with which it is not routinely associated.

Embodiments of the present invention aim to address such shortcomings in the prior art. Other shortcomings, whether mentioned herein or not, may also be addressed by embodiments of the invention.

SUMMARY OF THE INVENTION

In accordance with an embodiment of the present invention, there is provided an apparatus for detecting and storing data from a subscriber identity module (SIM) in a portable terminal, in which there are a first identity module being designated as a master module and a second identity module being designated as a slave module, and processor for, at power up of the portable terminal, reading data from the first module and storing the data in a working memory, and accessing, in the working memory, the data from the first identity module, before data from the second identity module is read into working memory.

In accordance with another embodiment of the present invention, there is provided a method for detecting and storing data from a subscriber identity module (SIM) in a portable terminal, in which data is read from a first identity module among a plurality of identity modules and the read data is stored in a memory, the stored data is enabled access in the memory, and data is read from a second identity module among the identity modules.

In accordance with an embodiment of the present invention, there is provided an apparatus for detecting and storing data from a subscriber identity module (SIM) in a portable terminal, in which there are a first identity module and a second identity module, a first modem associated with the first identity module and second modem associated with the second identity module, and a processor for deactivating the first identity module and the second identity module, associating the first identity module with the second modem, associating the second identity module with the first modem, and activating the first identity module and the second identity module.

In accordance with another embodiment of the present invention, there is provided a method for detecting and storing data from a subscriber identity module (SIM) in a portable terminal, in which a first identity module is associated with a first modem, a second identity module is associated with a second modem, the first identity module and the second identity module is de-activated, the first identity module is associated with the second modem, the second identity module is associated with the first modem, and the first identity module and the second identity module is activated.

Advantageously, the different aspects of the present invention combine to offer a seamless and speedy process for dealing with issues associated with altering the SIM/Modem associations.

DETAILED DESCRIPTION

Reference will be made to the preferred embodiment of the present invention with reference to the attached drawings. Like reference numerals denote components having substantially the same function through the specification and the drawings. For the purposes of clarity and simplicity, a detailed description of known functions and operations will not be given lest it should obscure the subject matter of the present invention.

Figure 4:
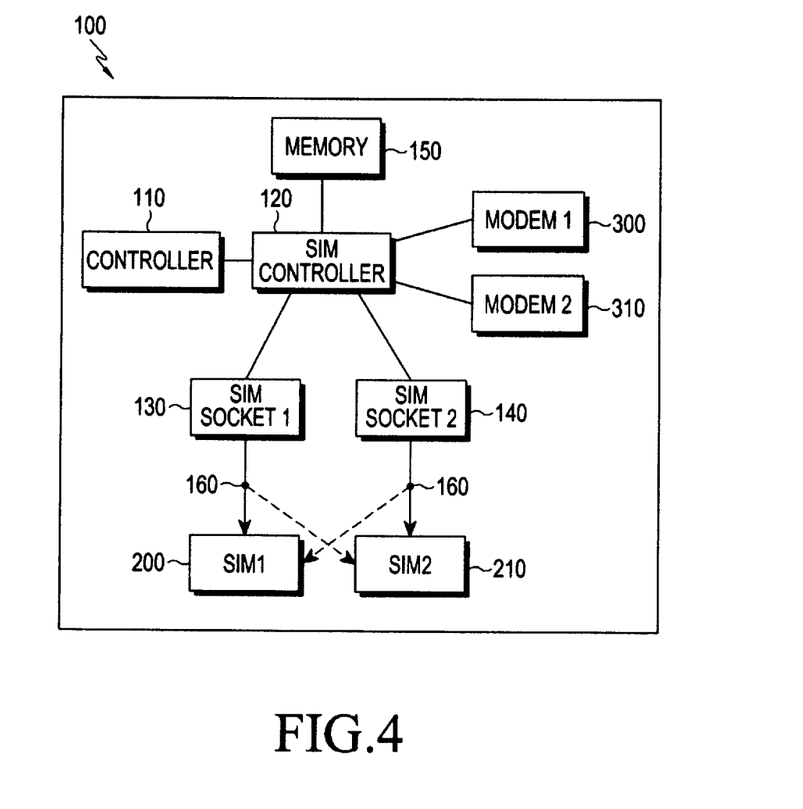
FIG. 4 shows an example architecture of the relevant parts of a portable terminal according to an embodiment of the present invention.

FIG. 4 shows a portable terminal 100 according to an embodiment of the present invention. Further details of the operation will be given in the description which follows.

Briefly, the device 100 comprises a memory 150, a controller 110, functionally connected to a SIM controller 120, which is operably connected to first and second SIM sockets 130, 140, in which are housed first and second SIM cards 200, 210. Also functionally connected to SIM controller 120 are first and second MODEMs 300, 310. The SIM controller maps each SIM socket to one of the MODEMs.

Among the terms set forth herein, a portable terminal (or terminal) refers to any kind of device capable of processing data that is transmitted or received to or from any external entity. The terminal may display icons or menus on a screen to which stored data and various executable functions are assigned or mapped. The terminal may represent a computer, a notebook, a tablet PC, a mobile device, and the like.

The controller 110 may be in the form of a microprocessor or microcontroller and controls overall operation of the terminal 100. The controller 110 is functionally connected to working memory, store memory, a power supply and various interfaces, knowledge of which is not required for present purposes.

Figure 1:
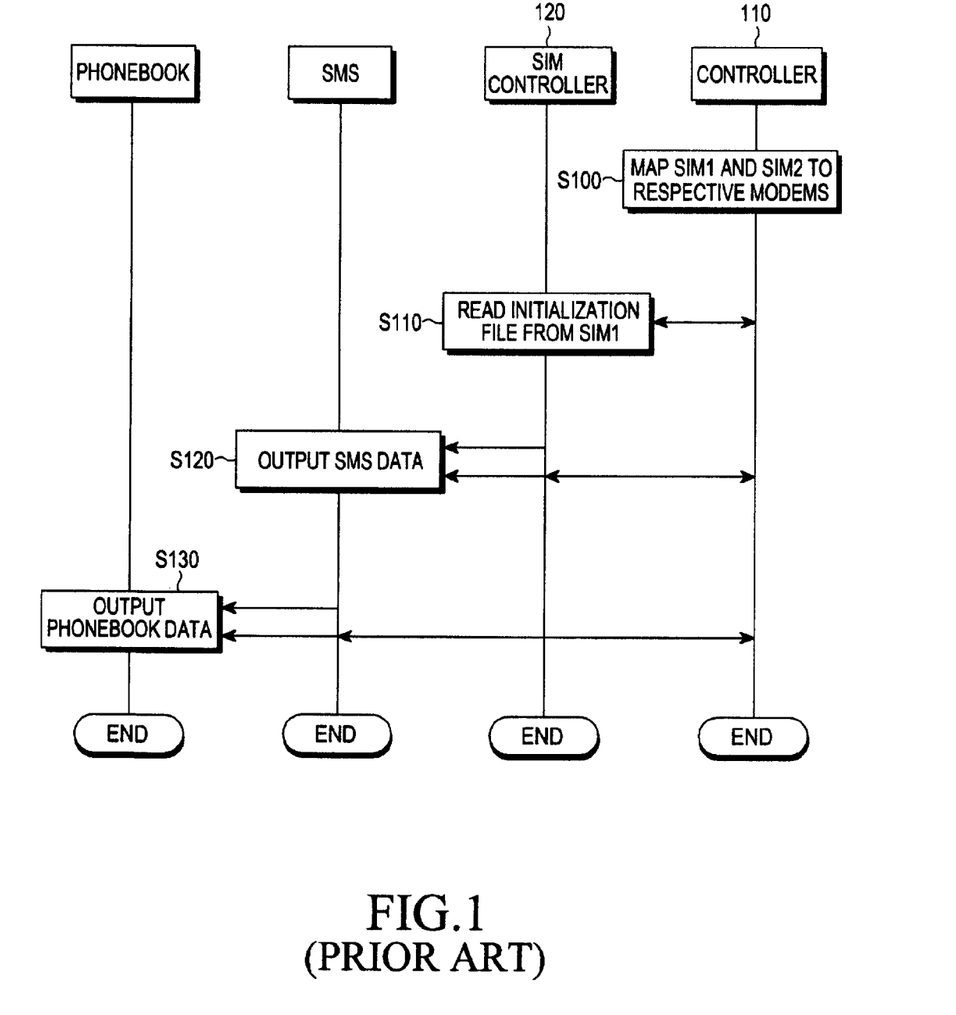
FIG. 1 illustrates the boot sequence as it relates to reading data from multiple SIMs in a prior art multi-SIM portable terminal.

FIG. 1 shows the steps involved at startup for a prior art portable terminal provided with two SIM cards. As shown, at initial power up or after a hard-reset, the device's processor is operable to read all phonebook and SMS data from each of the installed SIM cards before any use can be made of the read data. Since the memory used on SIM cards is generally slower than that provided internal to the portable terminal, it can take a relatively long time to read all the data from all installed SIMs in these circumstances. The more SIMs that are provided, the longer it takes to read in all the data stored on them.

In detail, the four vertical lines in FIG. 1 represent entities in the system for reading data from a SIM card. Firstly, the controller 110 maps SIM1 and SIM2 to the respective MODEMs at step S100. It then instructs the SIM controller 120 to read initialisation files from SIM1 at step S110. Next, at step S120, it reads SMS data from SIM1 and SIM2 and passes this data back to the controller 110 to be stored in working memory. Next, at step S130 it reads the phonebook data from both SIM1 and SIM2 and transfers this back to the controller 110 to be stored in working memory. Finally, once these steps have been completed and all SMS and phonebook data has been read from both SIMs, the data is accessible to the user and, for instance, the read phonebook data can be used to place a call.

As described above, an issue with the prior art is that the SIM mapping are only performed at power up, thus it is not possible to alter these operations without a power cycle, which is inconvenient for the user. A further issue is that it is generally only possible, on portable terminals supporting two different access technologies (e.g. 2G and 3G) for the slave or secondary SIM to access the older access technology (e.g. 2G). Furthermore, SIM Toolkit (STK or SAT) functionality is only provided for the Master or primary SIM. When data is read from both SIMs, there is a deal of redundancy, in that both SIMs contain global variables which are duplicated.

According to the teachings of the present invention, the processor of the portable terminal is operable to read, into working memory, data from each of the SIM cards in turn, as before, but is able to make use of the data from each SIM card as soon as it has been read in, rather than waiting for data from all of the SIM cards to be read in. This allows a quicker access to phonebook data from the first SIM card, without having to wait for phonebook data from all SIM cards to be read in. The data from the second and possible subsequent SIM cards are read in as a background process.

Figure 2:
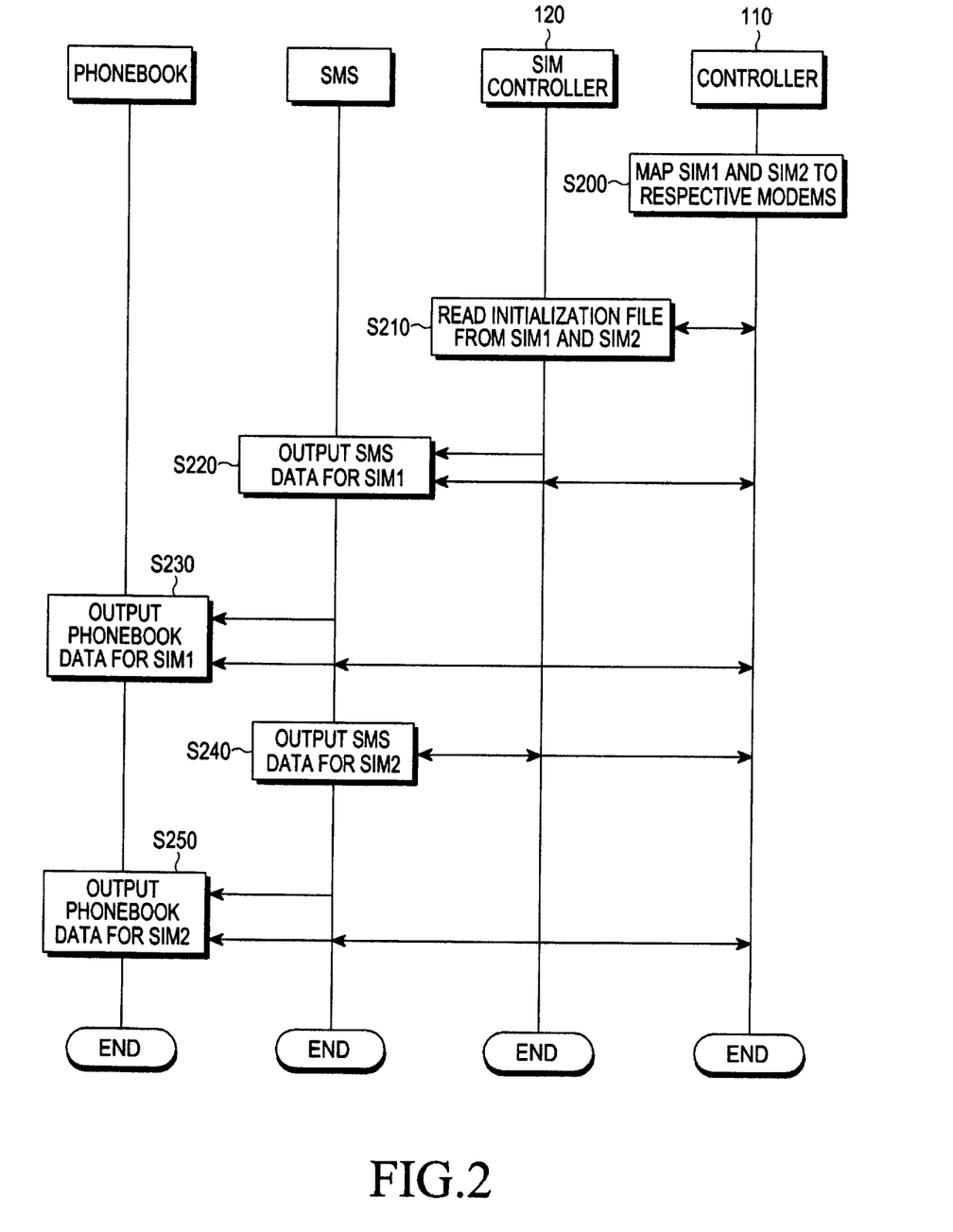
FIG. 2 illustrates the boot sequence as it relates to reading data from multiple SIMs according to an embodiment of the present invention.

In detail, FIG. 2 shows the processes according the embodiment of the present invention. As shown, the four vertical lines represent the same system entities as in FIG. 1. At step S200, the controller 110 maps SIM1 and SIM2 to the respective MODEMs. It then instructs the SIM controller 120 to read initialisation files from both SIMs at step S210. At step S220, it read SMS data from SIM1 and passes this back to the SIM controller 120 and on the controller 110 for storage in working memory. At step S230, phonebook data is read from SIM1 and similarly passed onto the SIM controller and then on to the controller 110 for storage in working memory.

Steps S240 and S250 are similar to steps S220 and S230, but in respect of SIM2, rather than SIM1.

It can be seen that the actions performed to gather data from SIM1 and SIM2 are separated, as compared to that shown in the prior art system of FIG. 1. In the embodiment shown in FIG. 2, the user is able to access phone book (and SMS) data immediately after step S230. In this way, phonebook entries from the Master SIM (or SIM1) can be accessed and made use of while data from the second SIM (SIM2) is read as a background process.

In cases where more than two SIMs are provided, it can be seen how the system of FIG. 2 can be expended readily.

Advantageously, the embodiment shown in FIG. 2 allows a quicker access to features from the first or Master SIM without having to wait for all the data to be read from the second or slave SIM into working memory. In portable terminals having more than two SIMs, thus providing savings in time and increased convenience for the user which are very significant and advantageous.

In a further embodiment of the present invention, means are provided in order to enable first and second SIM cards 200, 210, which are associated respectively with first and second MODEMs 300, 310, to be re-assigned so that the first SIM 200 becomes associated with the second MODEM 310, and the second SIM 210 becomes associated with the first MODEM 300.

The first and second MODEMs 300, 310 are devices provided in the portable terminal 100 which allow access to one or more features of a particular network or access technology. For instance, in a particular mobile telephone, a first MODEM 300 may be associated with and support features of a 2G network, while a second MODEM 310 may be associated with and support features of a 3G network.

In prior art multi-SIM devices, if the user wishes to alter the SIM/MODEM associations, it is necessary to power down the device and physically remove both SIM cards and to re-insert them in different sockets before powering the device back on.

The controller 110 is functionally connected to the SIM controller 120. The SIM controller 120 is operable to control the mapping of the respective first and second SIM cards 200 and 210, (which are inserted into physical sockets 130 and 140 respective), with the first and second MODEMs 300 and 310. The MODEMs are further connected to other circuitry within the portable terminal, such as RF transceiver circuitry, but details of this are not required for the present purposes.

In normal operation, SIM1 200 is inserted into socket 130 and is mapped by the SIM controller 120 to MODEM1 300. Similarly, SIM2 is inserted into socket 140 and is mapped by the SIM controller 120 to MODEM2 310. In prior art devices, if the respective SIM and MODEM associations require altering, the user would have to power down the device, would often have to remove the battery or a cover of the device, remove both SIM cards, physically swap them, re-assemble the device and power it back on so that the new SIM/MODEM associations were recognised by the SIM controller at power up.

Figure 3:
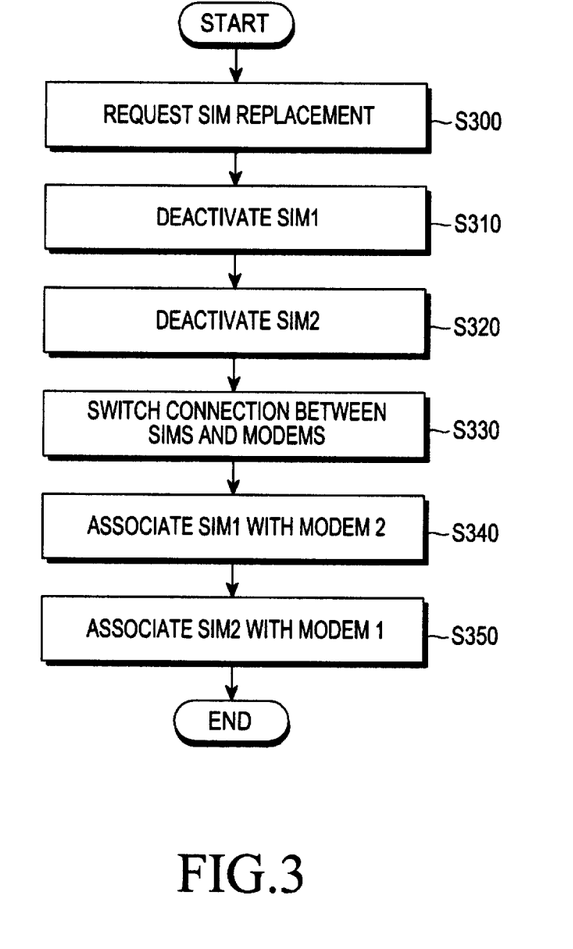
FIG. 3 illustrates how master and slave (or first and second) SIMs may be swapped under user control.

FIG. 3 shows the steps involved in the hot-swapping of the SIM cards according to the embodiment of the present invention. At step S300, the user selects a menu option to initiate SIM swap. At step S310, the controller 110 instructs the SIM controller 120 to deactivate SIM1 200, which causes it to be de-registered from its associated network. At step S320, the SIM controller 120 deactivates SIM2 210, which causes it to be de-registered from its associated network.

At step S330, the connections to the first and second SIM sockets 130, 140 are physically swapped, using multiplexers or switches 160.

At step S340, SIM1 200 is re-activated, but is now associated with MODEM2 310.

At step S 350, SIM2 210 is reactivated, but is now associated with MODEM1 300.

At the end of the process shown in FIG. 3, the SIMs are swapped with respect to the original MODEM associations. Whilst the swap is taking pace, which may take a few seconds the user is able to make use of other functions in the portable terminal 100, e.g. Wi-Fi access, diary functions, games.

If either of the SIMs are setup to require PIN verification on activation, the portable terminal 100 is operable to store the PIN for each such SIM so that the swap can be performed without the user having to re-enter it as part of the SIM swap process. Of course, if the portable terminal 100 is powered off, then the PIN will be required in the normal way, to prevent unauthorised use of the portable terminal.

In the embodiment of the present invention shown in FIG. 4, the user is able to instruct the SIM controller 120 to alter the SIM/MODEM associations via a menu command. To this end, the controller 110 is operable to display to the user a menu choice, whereby the user is able to select a menu item labelled "SIM SWAP" or similar. By selecting such an option, the controller 110, on receipt of the user's instructions, displays on the device's display a message "SIM Swap in progress" or similar. This may be displayed as a banner warning in a status area, so that the user is able to perform other tasks using the portable terminal 100.

In order to swap the associations, the SIM controller 120 is connected to physical SIM sockets 130 and 140 via a switch array or multiplexer, thus allowing the physical connections to be switched as required and to reflect the user's desire to swap SIM/MODEM associations.

By allowing switching of the SIM/MODEM associations in this way, without powering down the portable terminal, the user is able to much more conveniently access features normally associated with one of the MODEMs but not the other on his or her choice of network. As an example, if the user wishes to use SIM2 210 to make a call on the access technology associated with MODEM1 300 (e.g. using a 3G network feature such as video-calling), but SIM2 is currently associated with MODEM2 310, which only supports 2G features, the user is able to quickly select the appropriate menu feature which sets in train the processes mentioned previously so that the user can make a video call using MODEM1 300, with his or her identity being set by SIM2 210. This allows the user to manage his bills and accounts easily. This can be useful if, for instance, the user has a first SIM 200 assigned to him by his employer for work purposes, and a second SIM 210, which is for use with his own personal account.

Similarly, SIM1 and SIM2 could each be associated with different network providers so that if the user is travelling around a country or region, he may switch between SIMs to ensure that he is registered to his preferred network in a particular area.

In a preferred embodiment, the SIM controller 120 or controller 110 is operable to determine if a user is able to perform a certain function using his presently selected SIM, and to notify him if there is a problem, and possibly to initiate a corrective action. Of instance, if the user wishes to make a video call, but attempts to do this using the SIM associated with a 2G modem in the portable terminal, which does not support video-calling, the userwill be notified that this operation is not possible and may be given the option of initiating a SIM swap procedure, as set out previously. In this way, even a relatively unskilled user of the portable terminal is able to benefit from the variety of features available.

Figure 5:
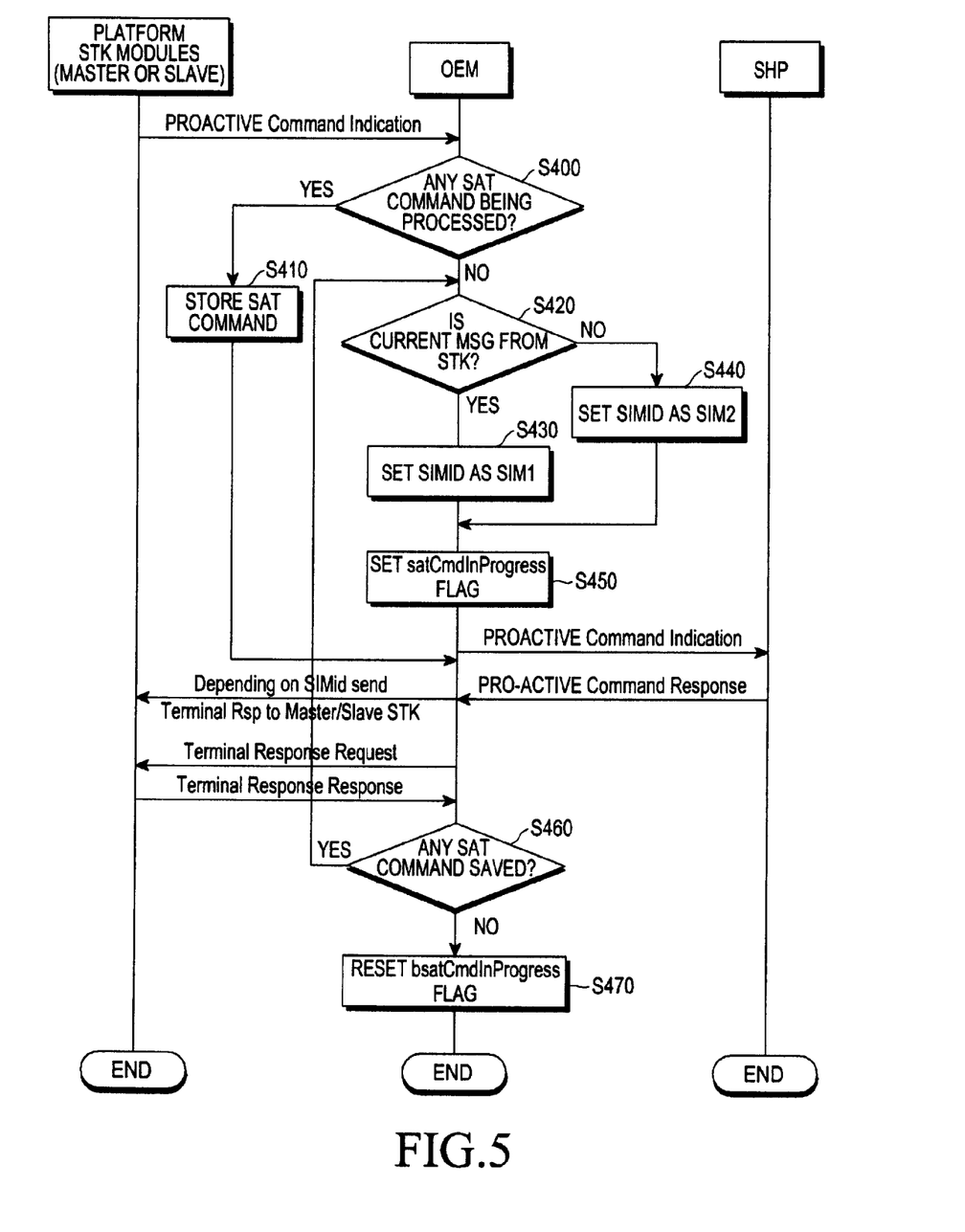
FIG. 5 shows details of how a Multi-SIM portable terminal is able to offer SIM Toolkit functionality for each installed SIM.

FIG. 5 shows a flowchart detailing how SIM Toolkit (SAT or STK) can be used with both SIMs in the portable terminal.

As shown, when an STK message is sent by the master or slave SIM, a check is made (S400) to determine if there is any STK command currently being process by checking the flag bSATCmdInProgress. If such a command is being processed, then the incoming command is stored (S410). Otherwise, if there are no commands currently being processed, then a check is made (S420) to determine if the command was sent by the Master or the Slave SIM. The flag SIMId is then set to SIM1 (Master) (S430) or SIM2 (Slave) (S440), accordingly.

The flag bSatCmdInProgress is set (S450) and the command is sent for further processing. When a request is sent for a Terminal Response for the command, the TERMINAL response message is sent to the appropriate SIM (Master or Slave) depending on the SIMId set at step S430 or S440.

On receipt of the TERMINAL response confirmation, a check is then made (S460) to see if there is a stored STK message waiting to be processed from step S410. If so, the steps from S420 are repeated for the stored command. Otherwise, if there is no stored STK command, then the bSatCmdInProgress flag is reset (S470).

By use of such a process, STK functionality is made available to both (or each) SIM present in a portable terminal. The skilled person will readily appreciate how such a system can be expanded for a portable terminal having more than two SIMs.

Figure 6:
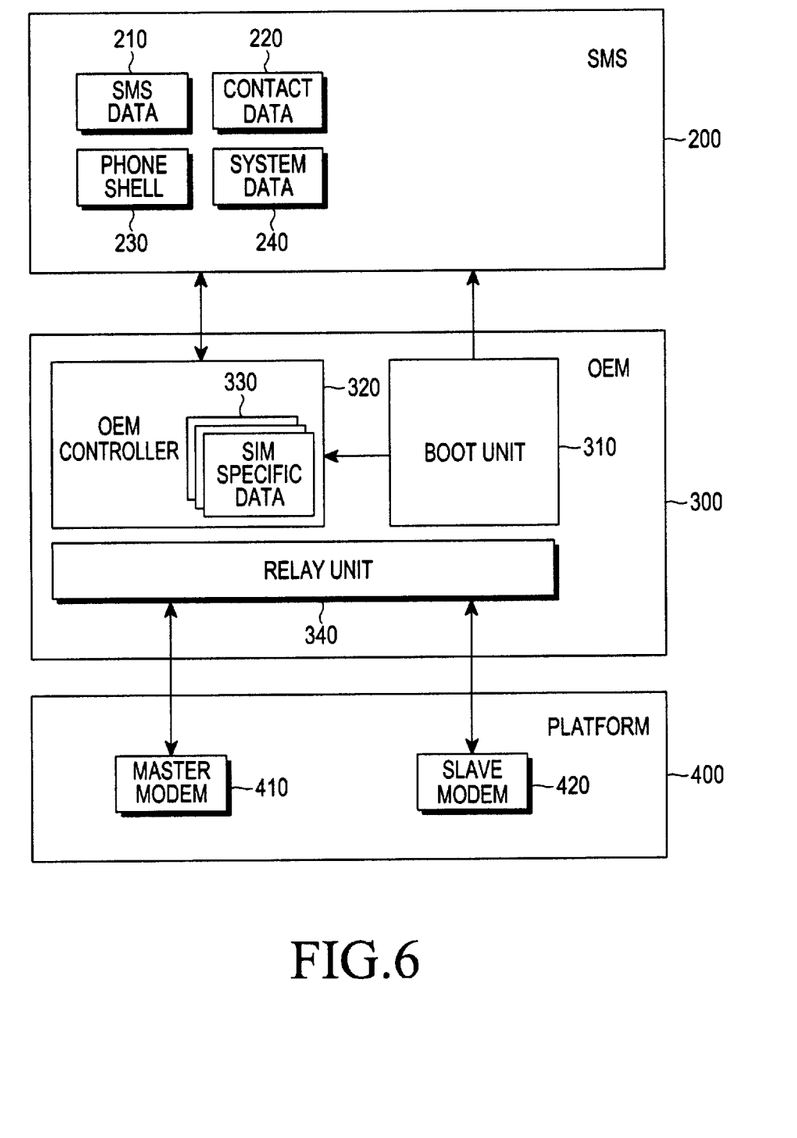
FIG. 6 shows an architecture for use with embodiments of the present invention.

FIG. 6 shows a system architecture for use with embodiments of the present invention. As shown, there are three major sub units. The first on 200 is the Man Machine Interface (MMI). It comprises several modules or data sets, such as SMS data 210 read from the SIMs, contact data 220 read from the SIMs, phone shell 230 and system data 240. Other data sets or software modules are included here but these are not shown, for clarity.

The second major unit is the OEM 300, which is the controller for the system. It comprises a Boot Unit 310, which is operable to:

initialise frequently accessed multi SIM data stored in OEM;

request the Phone Shell (230) to initialise;

notify the Phone Shell (230) to display PIN entry screens for all SIMs, if PIN is enabled;

notify the MMI (Contact 220 & MSG 210) after each PIN verification to facilitate reading data; and notify the MMI (Contact 220 & MSG 210) on completion of SIM1 read to make the data read from it accessible.

The OEM 300 also comprises a controller 320, which is operable to:

maintain SIM specific data 330 (for any number of SIMs);

check if an MMI 200 request can be serviced in OEM 300 and, if not, to send the request to the relay unit 340 so that the platform 400 can handle the request;

handle STK messages, and queues if there is already an existing message being processed by the MMI 200;

initiate SIM swap functionality if user chooses the option through MMI 200.

The final component in the OEM 300 is the relay unit 340. It is operable to manage communications with the platform 400, which controls the MODEMs. The relay unit 340 is operable to This ensures that SHP uses the same interface for all SIM functions (such as fnl(params, eSIMID SIMID_1)). It also acts to forward a request to the appropriate modem (Master 410 or Slave 420) based on the SIMID.

Lastly, the Platform 400 comprises the MODEMs 410 and 420, which are designated the Master and Slave respectively.

The skilled person will appreciate that other system architectures are possible, the example set out above provides a convenient and efficient means of enabling the functions which have been described here to be implemented.

By making use of embodiments of the present invention, a user is able to enjoy a richer experience, with greater ease of use and no requirement to physically remove or swap SIM cards if he wishes to use different functions with one or other of his installed SIM cards.

The different aspects of the present invention offer particular benefits when they are able to co-operate effectively to allow a user far faster access to certain functions when the SIM/Modem associations are swapped. If a user initiates a SIM swap, as has been set out, access to the data on the SIMs would be more speedily available, as already set out and any SIM toolkit messages which are already being handled, can continue to be handled, as per the process described in relation to FIG. 5.

Embodiments according to aspects of the present invention provide a tangible computer readable medium such as a CD ROM, an RAM, a floppy disk, a hard disk, or a magneto-optical disk or computer code downloaded over a network originally stored on a remote recording medium or a non-transitory machine readable medium and to be stored on a local recording medium, to perform the method as herein described.

At least some elements discussed herein may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks.

At least some elements may be may be configured to reside on an addressable storage medium and be configured to execute on one or more processors. That is, the elements may be implemented in the form of a tangible computer-readable storage medium having recorded thereon instructions that are, in use, executed by a computer or other suitable device. The elements may include, by way of example, components such as software components, object-oriented software components, class components and task components, processes, functions, attributes, procedures, subroutines, segments of program code, drivers, firmware, microcode, databases, data structures, tables, arrays, and variables. The tangible medium may take any suitable form, but examples include solid-state memory devices (ROM, RAM, EPROM, EEPROM, etc.), optical discs (e.g. Compact Discs, DVDs, and others), magnetic discs, magnetic tapes and magneto-optic storage devices.

The example embodiments have been described with reference to the example components, modules and units discussed herein. Where appropriate, these functional elements may be combined into fewer elements or separated into additional elements. In some cases the elements are distributed over a plurality of separate computing devices that are coupled by a suitable communications network, including any suitable wired networks or wireless networks.

It should be noted that the various different embodiments of the invention described herein may be implemented individually or together, depending on the effect required. There is nothing inherently incompatible between then and greater benefit may be gained by creating a system using more than one of the described embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Therefore, it will be understood by those of ordinary skill in the art that various changes in form and details may be made therein without departing from the spirit and scope of the present invention as defined by the following claims.

What is claimed is:

1. An apparatus for detecting and storing data from a subscriber identity module in a portable terminal, comprising:
   a first identity module and a second identity module;
   a first modem associated with the first identity module and a second modem associated with the second identity module; and
   a processor for deactivating the first identity module and the second identity module, associating the first identity module with the second modem, associating the second identity module with the first modem, and activating the first identity module and the second identity module.

2. The apparatus of claim 1, wherein before activating the first identity module and the second identity module, the processor is operable to perform functions which do not require use of access technologies associated with the first identity module and the second identity module.

3. The apparatus of claim 1, wherein the de-activation and activation processes are initiated by a menu input.

4. The apparatus of claim 1, wherein the association of the first identity module and the second identity module with the first modem and the second modem is used one of a switch and a multiplexer.

5. A method for detecting and storing data from a subscriber identity module in a portable terminal, comprising:
   associating a first identity module with a first modem, and associating a second identity module with a second modem;
   de-activating the first identity module and the second identity module;
   associating the first identity module with the second modem, and associating the second identity module with the first modem; and
   activating the first identity module and the second identity module.

6. The method of claim 5, further comprising, before activating the first identity module and the second identity module, performing functions which do not require use of access technologies associated with the first identity module and the second identity module.

7. The method of claim 5, wherein the de-activation and activation processes are initiated via a menu input.

8. The method of claim 5, wherein the association of the first identity module and the second identity module with the first modem and the second modem is used one of a switch and a multiplexer.

* * * * *